United States Patent
Kim et al.

(10) Patent No.: US 9,762,844 B2
(45) Date of Patent: Sep. 12, 2017

(54) DISPLAY DEVICE AND MULTI DISPLAY DEVICE USING THE SAME

(71) Applicant: Samsung Display Co., Ltd., Yongin-si, Gyeonggi-Do (KR)

(72) Inventors: Yu Bin Kim, Busan (KR); Ki Soo Park, Cheonan-si (KR); Sang Sik Yang, Cheonan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 59 days.

(21) Appl. No.: 14/658,438

(22) Filed: Mar. 16, 2015

(65) Prior Publication Data

US 2016/0044802 A1    Feb. 11, 2016

(30) Foreign Application Priority Data

Aug. 5, 2014  (KR) .................. 10-2014-0100595

(51) Int. Cl.
  *H05K 5/00*  (2006.01)
  *H05K 7/00*  (2006.01)
  *H04N 5/64*  (2006.01)
  *G02F 1/1333*  (2006.01)

(52) U.S. Cl.
  CPC ......... *H04N 5/64* (2013.01); *G02F 1/133308* (2013.01); *G02F 2001/133325* (2013.01); *G02F 2201/503* (2013.01)

(58) Field of Classification Search
  CPC ..................................... G02F 1/1333
  USPC ................................... 361/679.21
  See application file for complete search history.

(56) References Cited

U.S. PATENT DOCUMENTS

| | | | |
|---|---|---|---|
| 5,128,662 A * | 7/1992 | Failla | G06F 1/1601 248/924 |
| 2006/0164567 A1 * | 7/2006 | Fukayama | G02F 1/133308 349/58 |
| 2008/0158468 A1 | 7/2008 | Kim et al. | |
| 2011/0019124 A1 | 1/2011 | Kim et al. | |
| 2013/0093647 A1 | 4/2013 | Curtis et al. | |

FOREIGN PATENT DOCUMENTS

KR  10-2011-0035021 A  4/2011
KR  10-2011-0122372 A  11/2011

* cited by examiner

*Primary Examiner* — Jerry Wu
(74) *Attorney, Agent, or Firm* — Robert E. Bushnell, Esq.

(57) ABSTRACT

A display device that includes: a bottom chassis having an inserting portion on a side wall; a display panel disposed on the bottom chassis; a top chassis coupled to the bottom chassis and having an opening on the position corresponding to the inserting portion; and a buffer member disposed in the inserting portion and the opening, wherein the buffer member comprises: a base unit disposed in the inserting portion; and a protrusion engaged with the inserting portion and the opening, overlapping or being drawn out from the base unit.

16 Claims, 10 Drawing Sheets

DISPLAY DEVICE AND MULTI DISPLAY DEVICE USING THE SAME

CLAIM PRIORITY

This application makes reference to, incorporates the same herein, and claims all benefits accruing under 35 U.S.C. §119 from an application earlier filed in the Korean Intellectual Property Office on 5 Aug. 2014 and there duly assigned Serial No. 10-2014-0100595.

BACKGROUND

1. Field

Aspects of embodiments of the present invention generally relate to a display device including a buffer member on a coupling surface and a multi-display device using the display device.

2. Description of the Related Art

In general, flat panel display devices such as a liquid crystal display device or an organic light emitting display device include a plurality of pairs of electrodes generating an electric field and an electro-optical active layer interposed therebetween. The liquid crystal display device includes a liquid crystal layer as the electro-optical active layer and the organic light emitting diode includes an organic light emitting layer as the electro-optical active layer.

In recent years, a plurality of display devices are combined in a tiling method to realize a multi-display device having a large screen, in order to provide a variety of information and advertisements. When the respective display devices are combined to form the multi-display device, the coupling surfaces of the respective display devices may be damaged due to the shock generated in the coupling process.

Therefore, a structure for protecting the coupling surfaces of the respective display devices forming the multi-display devices is thus required.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

The present disclosure of invention is directed to a display device designed to protect coupling surfaces when used in a multi-display device and to a multi-display device including the display device.

According to an embodiment of the present invention, a display device may includes: a bottom chassis having an inserting portion on a side wall; a display panel disposed on the bottom chassis; a top chassis coupled to the bottom chassis and having an opening on a position corresponding to the inserting portion; and a buffer member disposed in the inserting portion and the opening, wherein the buffer member comprises: a base unit disposed in the inserting portion; and a protrusion engaged with the inserting portion and the opening, overlapping or being drawn out from the base unit.

The base unit may have an inserting hole inside.

The protrusion may be movable in the inserting hole in a sliding manner.

The protrusion may be extended from the base unit.

The protrusion may extend outwards from the top chassis.

The protrusion may be disposed in substantially the same plane as the top chassis.

The inserting portion may be dented and extended in the side wall of the bottom chassis.

The buffer member may be made of a flexible material.

The display device may further include a mold frame coupled to the bottom chassis and having a penetrating hole.

The protrusion may be engaged with the penetrating hole.

According to an embodiment of the present invention, a multi-display device may include a first display device and a second display device disposed adjacent to each other, wherein each of the first display device and the second display device comprises: a bottom chassis having an inserting portion on a side wall; a display panel disposed on the bottom chassis; a top chassis coupled to the bottom chassis and having an opening on a position corresponding to the inserting portion; and a buffer member disposed in the inserting portion and the opening, wherein the buffer member comprises: a base unit disposed in the inserting portion; and a protrusion engaged with the inserting portion and the opening, overlapping or being drawn out from the base unit.

The base unit may have an inserting hole inside.

The protrusion may be movable in a sliding manner in the inserting hole.

The protrusion may be extended from the base unit.

The protrusion of the first display panel and the protrusion of the second display device may be in contact with each other.

The buffer members may be disposed on each coupling side surface of the first display device and the second display device.

The protrusion may be disposed in substantially the same plane as the top chassis.

The inserting portion may be dented and extended in the side wall of the bottom chassis.

The buffer member may be made of a flexible material.

The multi-display device may further include a mold frame coupled to the bottom chassis and having a penetrating hole, wherein the protrusion is disposed in the penetrating hole.

According to embodiments of the present invention, when display devices are coupled to each other to form a multi-display device, damages on coupling surfaces can be prevented and process efficiency can be improved.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
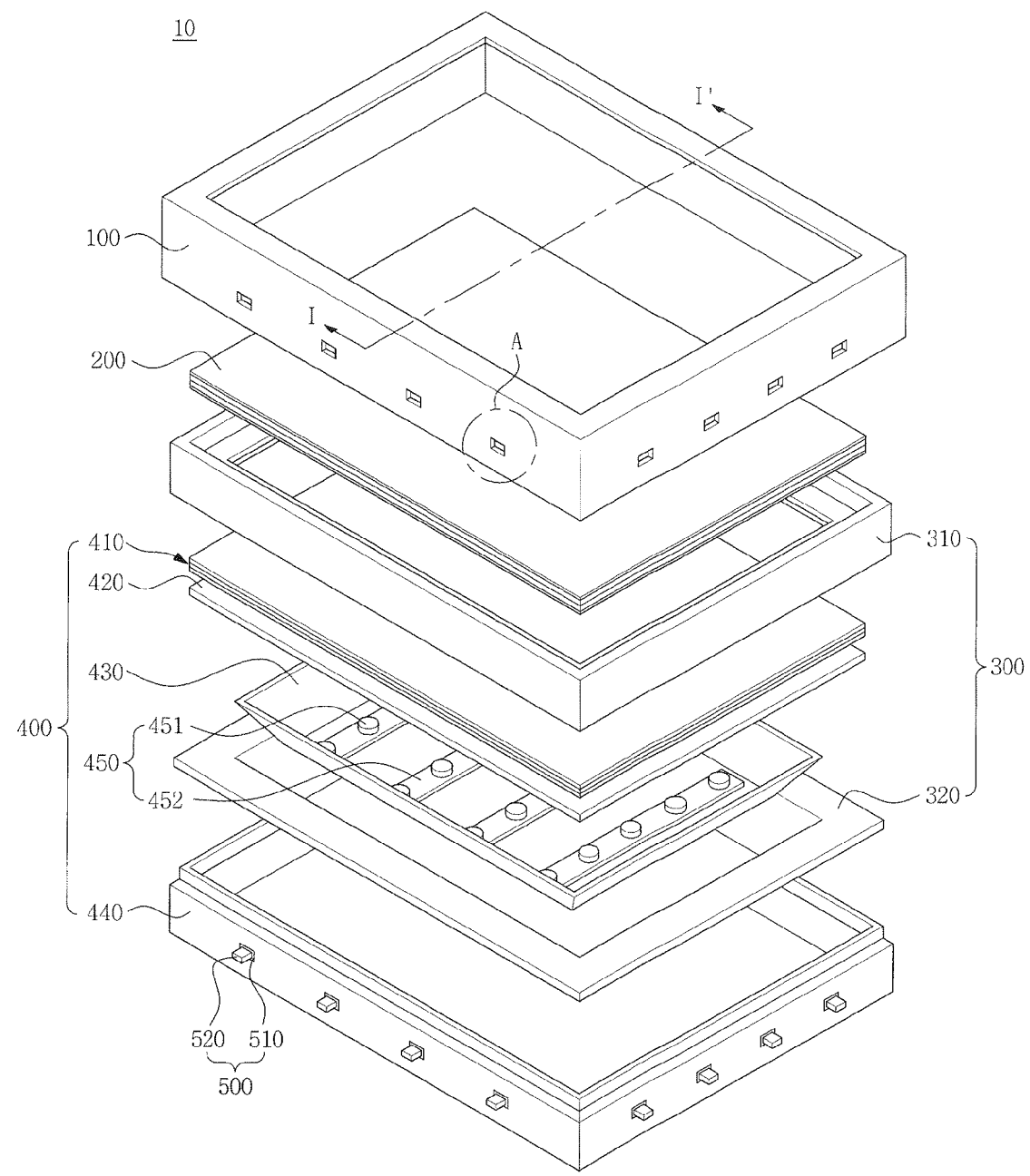
FIG. 1 is a schematic exploded perspective view illustrating a display device according to a first embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to a first embodiment of the present invention will be described with reference to FIGS. 1 and 2.

FIG. 1 is a schematic exploded perspective view illustrating a display device according to a first embodiment of the present invention. FIG. 2 is a schematic cross-sectional view illustrating a display device taken along a line I-I' of FIG. 1.

Figure 2:
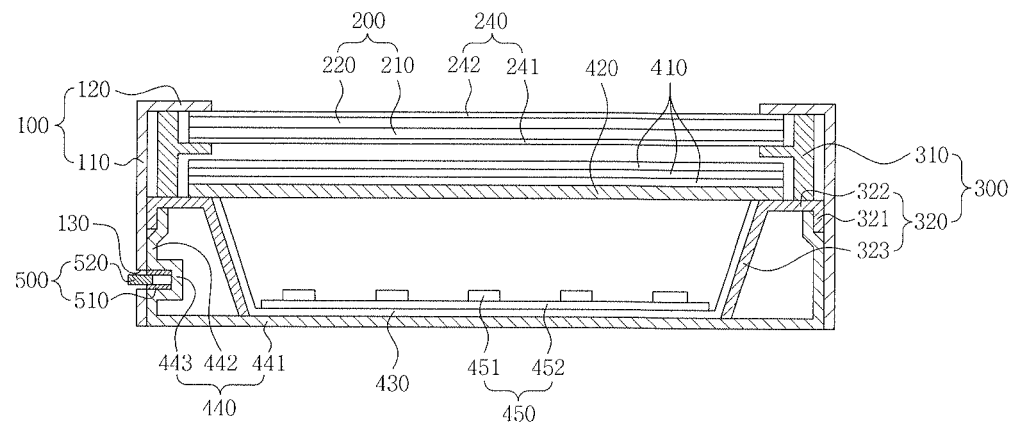
FIG. 2 is a schematic cross-sectional view illustrating a display device taken along a line I-I' of FIG. 1.

Referring to FIGS. 1 and 2, the display device 10 may include a display panel 200, a backlight assembly 400 configured to supply light to the display panel 200, a top chassis 100 configured to cover the display panel 200, and a mold frame 300 on which the display panel 200 is mounted.

The top chassis 100 may be coupled to the bottom chassis 440 in order to cover the display panel 200 mounted on the mold frame 300. The top chassis 100 has an opening exposing the display panel 200. The top chassis 100 may be disposed to cover an edge portion of a top surface and side surfaces of the display panel 120.

The top chassis 100 may have a side surface portion 110 configured to cover the side surfaces of the display panel 200 and a bending portion 120 bent from the side surface portion 110 and configured to cover the edge portion of an upper surface of the display panel 200.

The top chassis 100 may be coupled to the bottom chassis 440 by hooks and/or screws. Further, the top chassis 100 and the bottom chassis 440 may be coupled to each other in a variety of methods.

The display panel 200 is configured to display an image. The display panel 200 is a light-receiving type display panel and may be categorized into a liquid crystal display panel, an electrowetting display panel, an electrophoretic display panel, a microelectromechanical system display panel, and the like. It is assumed that the liquid crystal display panel is used as an embodiment of the present invention.

The display panel 200 may be provided in a quadrilateral panel form having two pairs of sides in parallel with each other. According to an embodiment of the present invention, the display panel 200 may have a quadrilateral form having a pair of long sides and a pair of short sides. The display panel 200 includes a first substrate 210, a second substrate 220 disposed to face the first substrate 210, and a liquid crystal layer (not illustrated) interposed between the first substrate 210 and the second substrate 220. The display panel 200 has, when viewed in a plan view, a display area on which an image may be displayed and a non-display area which surrounds a display area and does not display an image. The non-display area is hidden by the top chassis 100.

The first substrate 210 may include a plurality of pixel electrodes (not illustrated) and a plurality of thin film transistors (not illustrated) electrically connected to the plurality of pixel electrodes in one-to-one correspondence. The respective thin film transistors function as switches of driving signals supplied to the corresponding pixel electrodes. Further, the second substrate 220 may include a common electrode (not illustrated) forming an electric field controlling an arrangement of the liquid crystal with the pixel electrodes. The display panel 200 is configured to drive the liquid crystal layer to display an image.

The display panel 200 includes a driving chip (not illustrated), a tape carrier package (TCP) on which the driving chip may be mounted, a printed circuit board (not illustrated) electrically connected to the display panel 200 through the TCP. The driving chip generates a driving signal to drive the display panel 200 in response to an external signal. The external signal refers to a signal supplied from the printed circuit board and may include image signals, a variety of control signals, and driving voltages.

A polarizer 240 may be disposed on the display panel 200 and includes a first polarizer 241 and a second polarizer 242. The first polarizer 241 and the second polarizer 242 are respectively disposed on the first substrate 210 and the second substrate 220 in the opposite sides from facing surfaces of the first substrate 210 and the second substrate 220. That is, the first polarizer 241 may be attached on an outer side of the first polarizer 210 and the second polarizer 242 may be attached on an outer side of the second substrate 220. A transmissive axis of the first polarizer 241 may be substantially at right angles to a transmissive axis of the second polarizer 242.

The mold frame 300 may be coupled to the bottom chassis 440 and accommodates the display panel 200, an optical sheet 410, and a diffusion plate 420. Such a mold frame 300 may be formed of a flexible material such as plastics, in order to prevent damage on the optical sheet 410 and the diffusion plate 420.

The mold frame 300 may include an upper mold 310 on which the display panel 200 may be mounted and a lower mold 320 on which a diffusion plate 420 and an optical sheet 410 are mounted.

The upper mold 310 may be coupled to an upper surface of the lower mold 320 and supports the display panel 200. Further, the upper mold 310 may support the top chassis 100.

The lower mold 320 may be coupled to the bottom chassis 440 and supports the diffusion plate 420 and the optical sheet 410.

The lower mold 320 may include a protrusion 321 fixed to a side wall 442 of the bottom chassis 440, a diffusion plate mounting portion 322 which may be extended from the protrusion 321 and the diffusion plate 420 may be mounted on, and an inclining portion 323 which may be extended from the diffusion plate mounting portion 322 and the reflective sheet 430 may be seated on.

The mold frame 300 may be provided along the edge portion of the display panel 200 and supports the display panel 200 from the bottom of the display panel 200. The mold frame 300 may fix or support elements other than the display panel 200, such as the optical sheet 410 and the diffusion plate 420. The mold frame 300 may be provided in areas corresponding to four sides or at least a part of the four sides of the display panel 200. For example, the mold frame 300 may have a quadrilateral-loop form corresponding to the four sides of the display panel 200, or may have a 'C' form corresponding to three sides of the edge portion of the display panel 200.

Meanwhile, the mold frame 300 may be coupled to the top chassis 100. For example, screw holes may be formed on the top chassis 100, the bottom chassis 440, and the mold frame 300, and thus the top chassis 100, the bottom chassis 440, and the mold frame 300 may be coupled to each other at a time by a screw. Further, the top chassis 100, the bottom chassis 440, and the mold frame 300 may be coupled to each other in a variety of methods.

The backlight assembly 400 includes the optical sheet 410, the diffusion plate 420, the reflective sheet 430, the bottom chassis 440, and a light source unit 450.

The light source unit 450 includes a light source 451 and a circuit substrate 452 on which the light source 451 may be disposed. The light source unit 450 may be disposed at a bottom portion of the display panel 200. For example, the light source unit 450 may be disposed on a bottom surface of the reflective sheet 430 or on a bottom surface of the bottom chassis 440.

The circuit substrate 452 has a quadrilateral form and may have a reflective surface. For example, surfaces of the circuit substrate 452 may be coated with a material having reflective properties. Further, the circuit substrate 452 may be made of a metal material to perform functions of heat dissipation and accommodation. In this case, any metal material can be used without limitation and thus a variety of metal materials having high thermal conductivity can be used.

The light source 451 may include a light emitting diode (LED) and the like. The plurality of light sources 451 provides light for display devices to display image information. Light emitted from the light source 451 is guided toward the display panel 200 via the diffusion plate 420 and the optical sheet 410. The light sources 451 may be spaced a predetermined distance apart from each other in order to achieve luminance uniformity of the light source unit 450. In some embodiments, the plurality of light sources 451 may be spaced an equal distance apart from each other in width and length directions in a matrix form. In some embodiments, the light sources 451 may be disposed in a row in a length direction but disposed in zigzag in a width direction. In some embodiments, the light sources 451 may be disposed in a row in a width direction but disposed in zigzag in a length direction. However, embodiments of the present invention are not limited thereto, and thus the light sources 451 may be disposed on the circuit substrate 452 in a variety of ways in order to achieve the luminance uniformity. Further, a coupling hole (not illustrated) may be formed on the circuit substrate 452 to allow a coupling member (not illustrated) to be inserted and fixed thereto.

The diffusion plate 420 is disposed on the light source unit 450. The diffusion plate 420 may be configured to receive light emitted from the light source unit 450 and diffuse the light. That is, the diffusion plate 420 plays a role in improving luminance uniformity of the light emitted from the light source unit 450. In more detail, the diffusion plate 420 allows a bright spot produced in accordance with the arrangement of the light sources 451 not to be seen from a front side of the display device. In some embodiment, the diffusion plate 420 may be spaced a predetermined distance apart from the light source unit 450 with an air layer therebetween.

The diffusion plate 420 may be fixed to the mold frame 300. The diffusion plate 420 may be provided, for example, in a quadrilateral-panel form like the display panel 200. However, embodiments of the present invention are not limited thereto, and thus in a case where an LED may be used as the light source 451, the diffusion plate 420 may be provided in many different forms and may include predetermined grooves, protrusions, or the like depending on the position of the light source 451.

The diffusion plate 420 is described as a plate for ease of description, but it may be provided in a form of a sheet or film form to achieve slimness of display devices. That is, the diffusion plate 420 is to be understood as having a concept that includes not only a plate but also a film for guiding light.

The diffusion plate 420 may be formed of a light-transmissive material including, for example, acrylic resins, such as polymethylmethacrylate (PMMA), or polycarbonate (PC) so as to guide light efficiently.

The optical sheet 410 may be disposed on the diffusion plate 420 and may be configured to diffuse and/or collect light transmitted from the diffusion plate 420. The optical sheet 410 may include a diffusion sheet, a prism sheet, and a protective sheet.

The diffusion sheet may be configured to disperse light incident from the diffusion plate 420 so as to prevent the light from being partly concentrated.

The prism sheet may include prisms having a triangular cross-section and formed in a predetermined array on one surface thereof. The prism sheet may be disposed on the diffusion sheet and may collect light diffused from the diffusion sheet in a direction perpendicular to the display panel 200.

The protective sheet may be formed on the prism sheet and may serve to protect a surface of the prism sheet and diffuse light to achieve a uniform light distribution.

The reflective sheet 430 may be disposed between the light source unit 450 and the bottom chassis 440. The reflective sheet 430 reflects light emitted downwards from the diffusion plate 420 toward the display panel 200, thereby improving light efficiency.

The reflective sheet 430 may have a bottom portion and a wing portion extended from the bottom portion forming an obtuse angle with the bottom portion. The bottom portion of the reflective sheet 430 may be mounted on the bottom chassis 440 and the wing portion of the reflective sheet 430 may be disposed on the mold frame 300.

The reflective sheet 430 may be formed of, for example, polyethylene terephthalate (PET) so as to possess reflective properties. One surface of the reflective sheet 430 may be coated with a diffusion layer containing, for example, titanium dioxide.

In some embodiments, the reflective sheet 430 may be formed of a material containing a metal, such as silver (Ag).

The bottom chassis 440 accommodates the reflective sheet 430 and the diffusion plate 420. A bottom surface of the bottom chassis 440 may be formed in parallel with the diffusion plate 420. The bottom chassis 440 may be formed of a metal material having rigidity, such as stainless steel, or a material having good heat dissipation properties, such as aluminum or an aluminum alloy. The bottom chassis 440 is responsible for maintaining a framework of the display device and protecting a variety of elements accommodated therein.

With the above-described structure of the display device, a multi-display device can be realized by coupling the respective display devices. In a case where the respective display devices are coupled to each other, the side surface portion 110 of the top chassis 100 may be a coupling surface.

When the respective display devices are coupled to each other, some shock may be caused and damage the top chassis 100.

Therefore, a buffer member is introduced in order to protect the coupling surfaces of the respective display devices forming the multi-display device. Hereinafter, the buffer member 500 according to an embodiment of the present invention will be described with reference to FIGS. 2 to 6.

Figure 3:
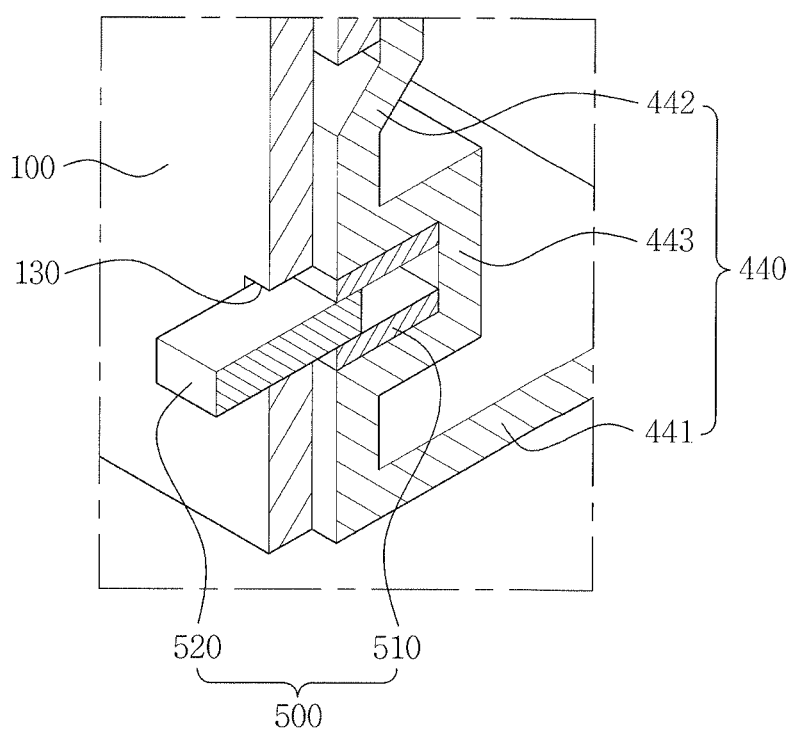
FIG. 3 is a partial perspective view enlarging an "A" part of FIG. 1.
Figure 4A:
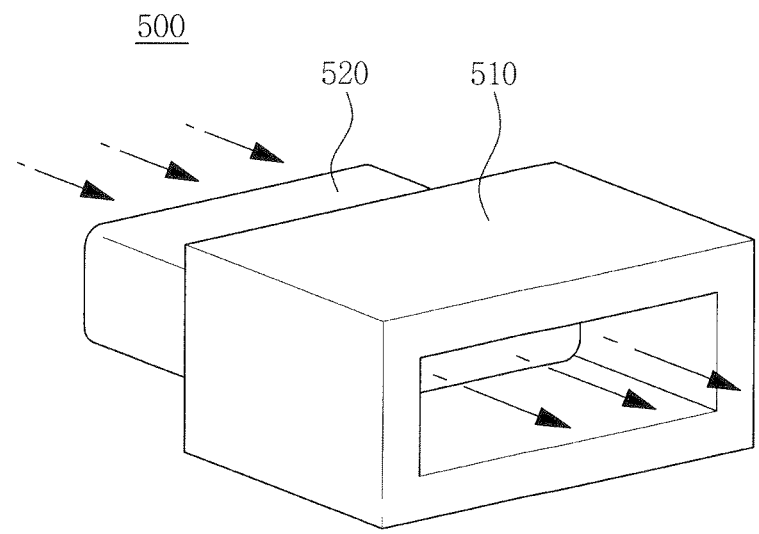
FIG. 4A is a schematic perspective view illustrating a buffer member of FIG. 1.
Figure 4B:
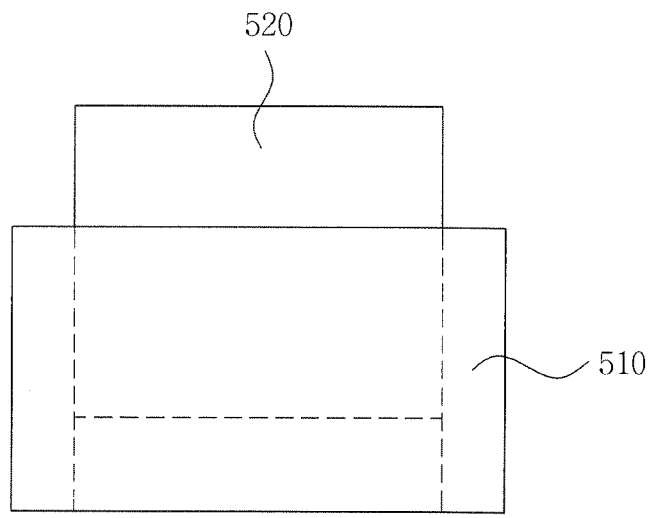
FIG. 4B is a schematic plan view illustrating the buffer member of FIG. 1.
Figure 5:
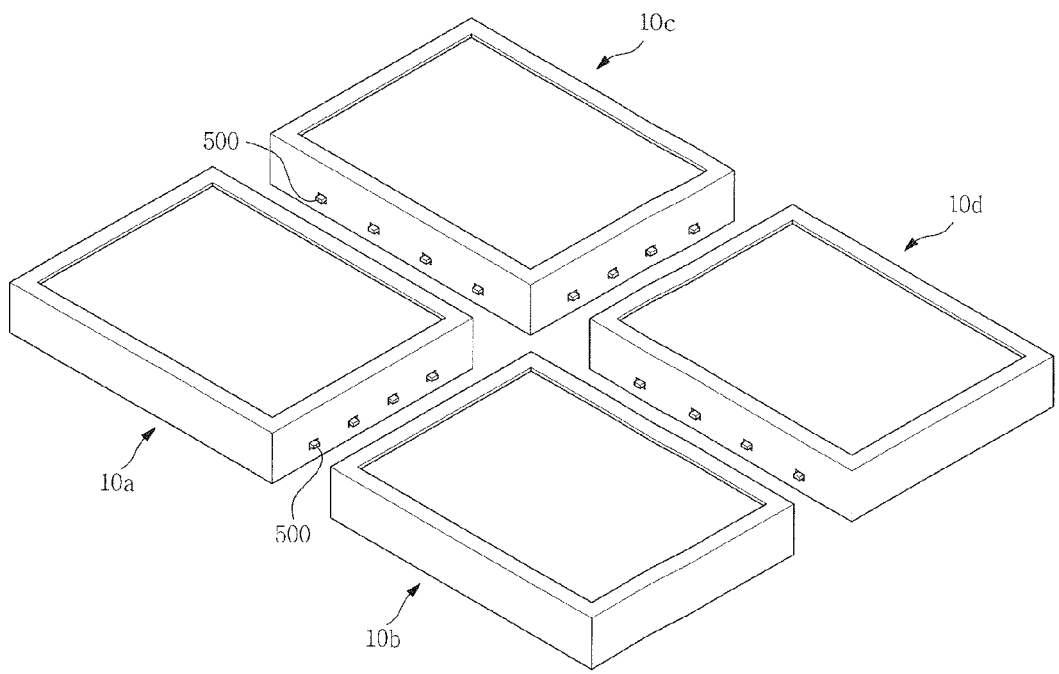
FIG. 5 is a schematic perspective view illustrating a multi-display device before the display devices are coupled to each other.
Figure 6:
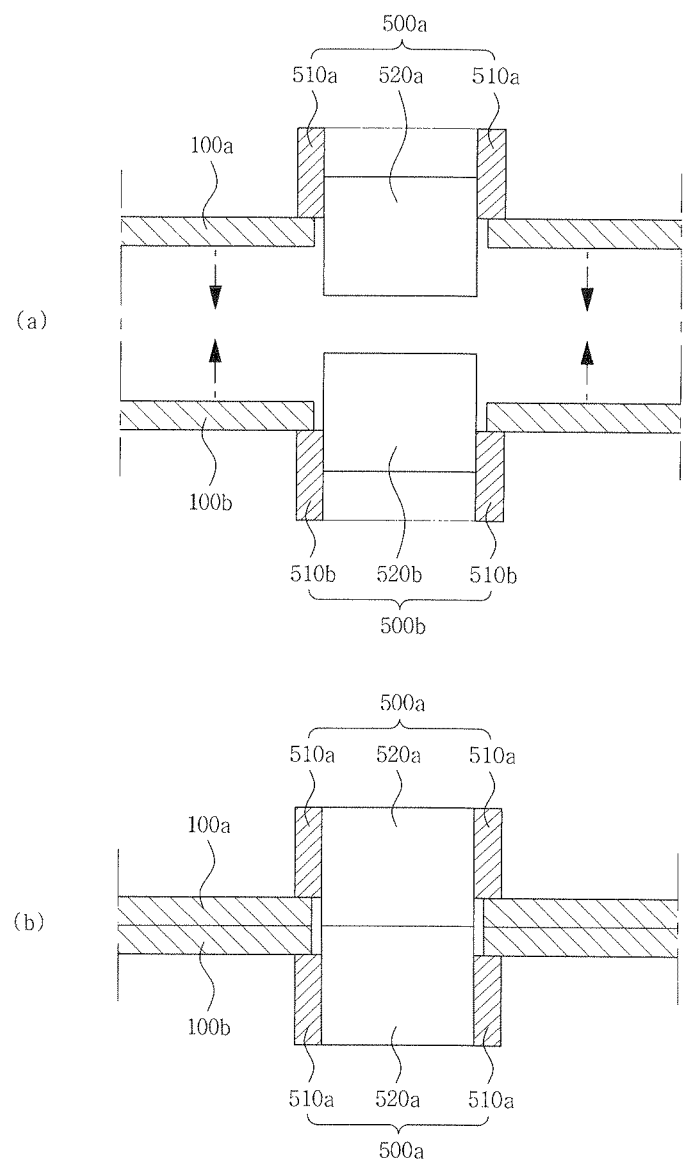
FIG. 6 is a plan view illustrating a method of coupling the respective display devices using the buffer member.

FIG. 3 is a partial perspective view enlarging an "A" part of FIG. 1. FIG. 4A is a schematic perspective view illustrating the buffer member of FIG. 1. FIG. 4B is a schematic plan view illustrating the buffer member of FIG. 1. FIG. 5 is a schematic perspective view illustrating the multi-display device before the display devices are coupled to each other. FIG. 6 is a plan view illustrating a method of coupling the respective display devices using the buffer member.

Referring to FIGS. 2 to 6, the bottom chassis 400 has an inserting portion 443 on the side wall 442 and the top chassis 100 has an opening 130 in a position corresponding to the inserting portion 443.

The inserting portion 443 of the bottom chassis 440 is dented and extended in the side wall 442. The opening 130 of the top chassis 100 may be formed on the side surface portion 110. For example, the side wall 442 of the bottom chassis 440 and the side surface portion 110 of the top chassis 100 are adjacently disposed and the inserting portion 443 of the bottom chassis 440 and the opening 130 of the top chassis 100 may be disposed to face each other.

With above-described structure, the buffer member 500 may be disposed on the inserting portion 443 and the opening 130.

The buffer member 500 includes a base unit 510 disposed in the inserting portion 443 and a protrusion 530 engaged with the inserting portion 443 and the opening 130, overlapping or being drawn out from the base unit 510. The base unit 510 and the protrusion 520 may be separately manufactured and then the protrusion 520 may be inserted to the based portion 510 to form the buffer member 500.

The buffer member 500 may be formed of a flexible material. For example, the buffer member 500 may be formed of silicon-based rubber. For example, the silicon rubber may have a hardness in a range of 60 to 80. Besides, the buffer member 500 may be formed of a variety of flexible materials capable of absorb shock.

The base unit 510 is, as illustrated in FIG. 3, disposed in the inserting portion 443 of the bottom chassis 440. The base unit 510 may have an inserting hole inside.

The protrusion 520 is movable in the inserting hole of the base unit 510 in a sliding manner, as illustrated in FIGS. 4A and 4B. The protrusion 520 is movable forwards and backwards along the inserting hole. In the respective display devices, the protrusion 520 may extend outwards from the top chassis 100. In the multi-display device in which the respective display devices are coupled to each other, the protrusion 520 may be disposed in substantially the same plane as the top chassis 100.

In a case where the respective display devices are coupled to each other, the buffer member 500 of the flexible material may minimize the external shock applied on the coupling surface of the display device by using migration and transformation of the protrusion 520.

Hereinafter, the coupling of the display devices using the buffer member 500 will be described in detail with reference to FIGS. 5 and 6. Meanwhile, for ease of description, a buffer member 500*a*, a base unit 510*a*, a protrusion 520*a*, and a top chassis 100*a* of a first display device 10*a* will be respectively called a first buffer member, a first base unit, a first protrusion, and a first top chassis. Further, a buffer member 500*b*, a base unit 510*b*, a protrusion 520*b*, and a top chassis 100*b* of a second display device 10*b* will be respectively called a second buffer member, a second base unit, a second protrusion, and a second top chassis.

With reference to FIGS. 5 and 6, the first to fourth display devices 10*a* to 10*d* may realize a multi-display device. FIG. 5 illustrates a multi-display device formed by four display devices arranged in a 2×2 matrix form, but not limited thereto and thus may be manufactured in many different structures. The first to fourth display devices 10*a* to 10*d* include the buffer members 500 on coupling surfaces. For example, the first to fourth display devices 10*a* to 10*d* may include four buffer members 500 on the coupling surface. Besides, the number of the buffer member 500 may be adjustable in consideration of the shock generated in the coupling process.

The first buffer member 500*a* and the second buffer member 500*b* may be disposed to face each other before the respective display devices are coupled to form the multi-display device. The first protrusion 520*a* may extend outwards from the first top chassis 100*a* in the first base unit 510*a*. The second protrusion 520*b* may extend outwards from the second top chassis 100*b* in the second base unit 510*b*.

When the respective display devices are coupled to form the multi-display device, the first protrusion 520*a* is brought into contact with the second protrusion 520*b*. The first protrusion 520*a* and the first top chassis 100*a* may be disposed in substantially the same plane. That is, an end portion of the first protrusion 520*a* may be aligned with an end portion of the first top chassis 100*a*. The second protrusion 520*b* and the second top chassis 100*b* may be disposed in the substantially the same plane. That is, an end portion of the second protrusion 520*b* may be aligned with an end portion of the second top chassis 100*b*. Therefore, in a case where the first display device and the second display device are coupled to each other, the first protrusion 520*a* and one surface of the first top chassis 100*a* may be brought into contact with the second protrusion 520*b* and one surface of the second top chassis 100*b*.

As described above, the buffer member 500 may minimize the shock generated in the coupling process of the respective display devices by using the movable protrusion 520.

Hereinafter, second to sixth embodiments of the present invention will be described with reference to FIGS. 7 to 12C. For ease of description, repeated description of the configurations described for the first embodiment of the present invention will not be provided.

Figure 7:
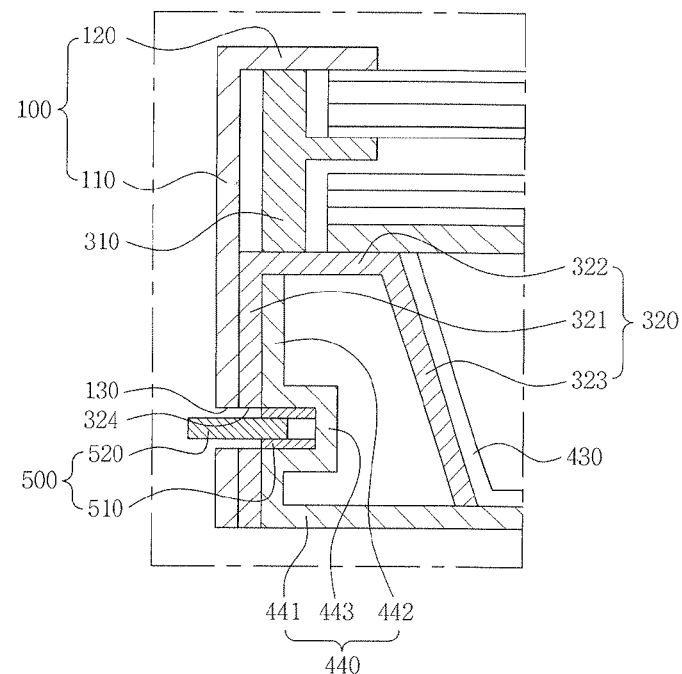
FIG. 7 is a schematic cross-sectional view illustrating a display device according to a second embodiment of the present invention.
Figure 8:
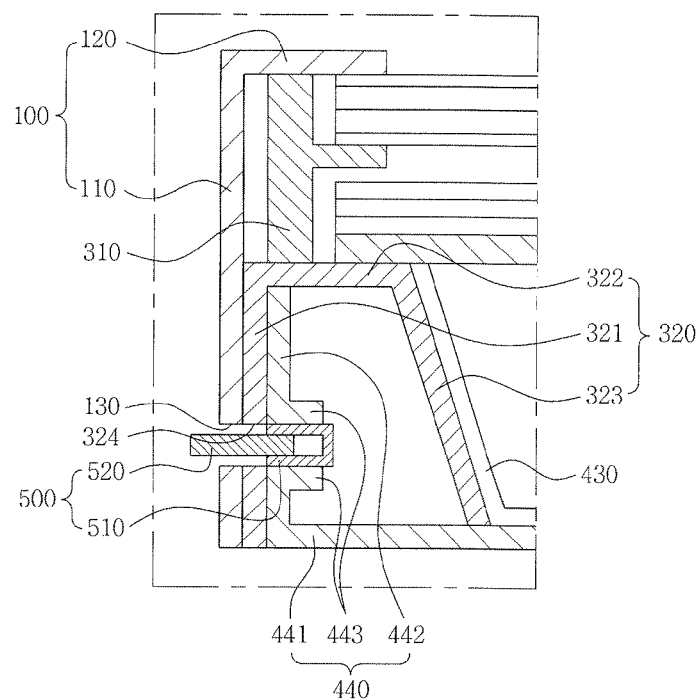
FIG. 8 is a schematic cross-sectional view illustrating a display device according to a third embodiment of the present invention.
Figure 9:
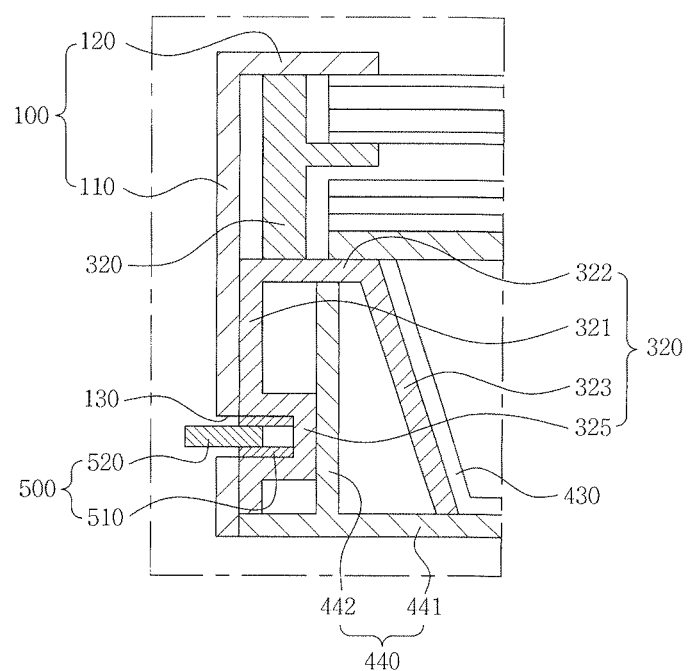
FIG. 9 is a schematic cross-sectional view illustrating a display device according to a fourth embodiment of the present invention.
Figure 10A:
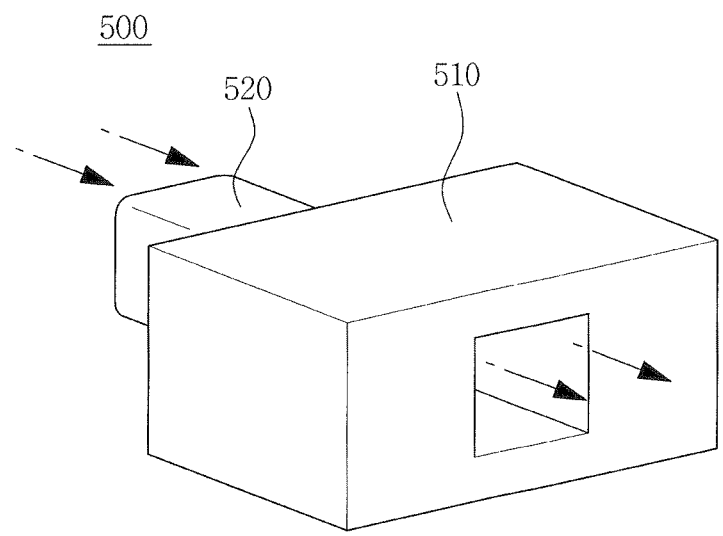
FIG. 10A is a schematic perspective view illustrating a buffer member according to a fifth embodiment of the present invention.
Figure 10B:
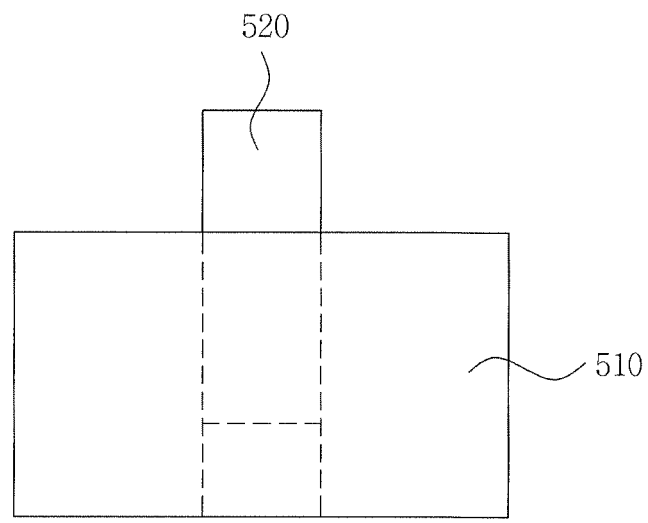
FIG. 10B is a schematic plan view illustrating a buffer member according to the fifth embodiment of the present invention.
Figure 11A:
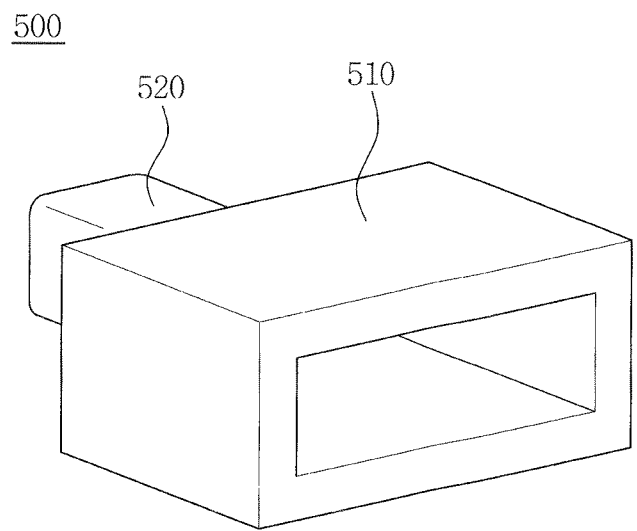
FIG. 11A is a schematic perspective view illustrating a buffer member according to a sixth embodiment of the present invention.
Figure 11B:
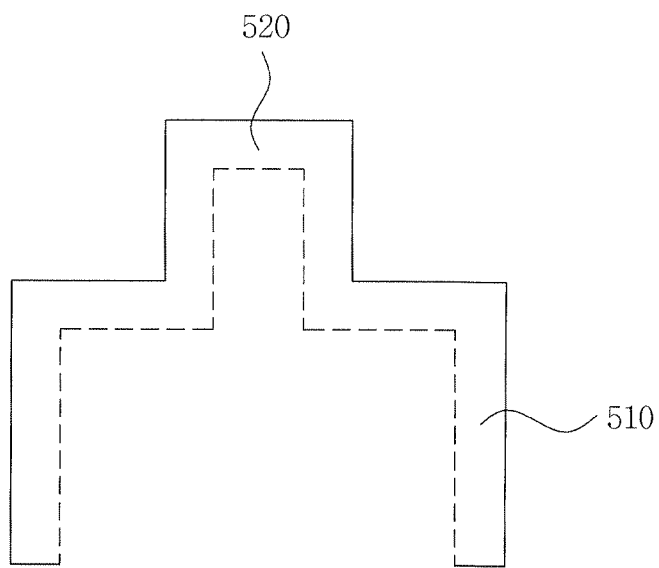
FIG. 11B is a schematic plan view illustrating the buffer member according to the sixth embodiment of the present invention.
Figure 12A:
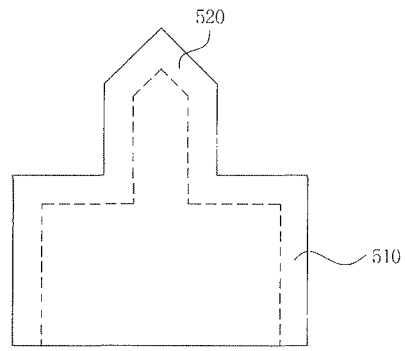
FIGS. 12A to 12C are plan views illustrating various forms of the buffer member.
Figure 12B:
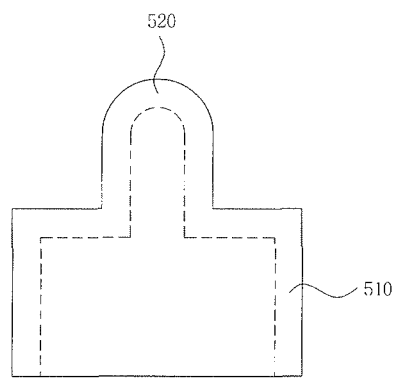
Figure 12C:
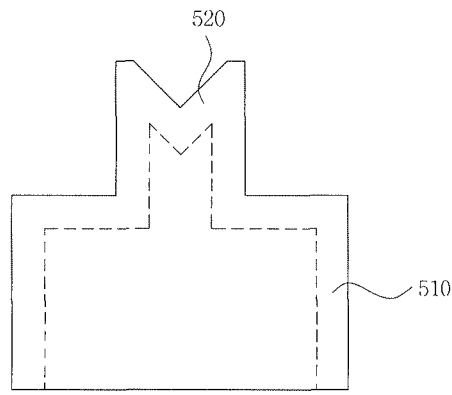

FIG. 7 is a schematic cross-sectional view illustrating a display device according to a second embodiment of the present invention. FIG. 8 is a schematic cross-sectional view illustrating a display device according to a third embodiment of the present invention. FIG. 9 is a schematic cross-sectional view illustrating a display device according to a fourth embodiment of the present invention. FIG. 10A is a schematic perspective view illustrating a buffer member according to a fifth embodiment of the present invention. FIG. 10B is a schematic plan view illustrating the buffer member according to the fifth embodiment of the present invention. FIG. 11A is a schematic perspective view illustrating a buffer member according to a sixth embodiment of the present invention. FIG. 11B is a schematic plan view illustrating the buffer member according to the sixth embodiment of the present invention. FIGS. 12A to 12C are plan views illustrating various forms of the buffer member.

Referring to FIG. 7, in a case where a top chassis 100, a mold frame 300, and a bottom chassis 440 are integrally coupled to each other, the mold frame 300 according to the third embodiment of the present invention may have a penetrating hole to allow a buffer member 500 to be disposed therein. The buffer member 500 may be disposed on an inserting portion 443, a penetrating hole 324, and an opening 130.

A protrusion 321 of the mold frame 300 may be extended in a length direction, in contrast with the first embodiment of the present invention. One end portion of the protrusion 321 may substantially match one end portion of a side surface portion 110 of the top chassis 100.

Referring to FIG. 8, an inserting portion 443 of a bottom chassis 440 according to the third embodiment of the present invention may have an opening. In a case where the inserting portion 443 has the opening, a base unit 510 may have one of the openings of the inserting hole closed, in contrast with the first embodiment of the present invention, in order to limit the moving direction of the protrusion 520. That is, the base unit 510 according to the first embodiment of the present invention has the inserting hole open to both sides so that two openings are formed, whereas the base unit 510 according to the third embodiment of the present invention has the inserting hole of which an opening disposed opposite to the protruding direction of the protrusion 520 is closed. The closed opening may limit the final position of the protrusion 520 inserted to the base unit 510.

Referring to FIG. 9, a mold frame 300 according to the fourth embodiment of the present invention may include a mold frame inserting portion 325. That is, according to the fourth embodiment of the present invention, a space where the buffer member 500 may be inserted may be formed on the mold frame 300 in contrast with the first embodiment of the present invention where the space may be formed on the bottom chassis 440.

Referring to FIGS. 10A and 10B, a buffer member 500 according to the fifth embodiment of the present invention may have a protrusion 520 and an inserting hole of a base unit 510 that are smaller than the buffer member according to the first embodiment of the present invention. A size of the protrusion 520 may be adjustable in consideration of a process cost and a buffering action of the buffer member 500.

Referring to FIGS. 11A and 11B, according to the sixth embodiment of the present invention, a protrusion 520 may be extended from a base unit 510. That is, when a buffer member 500 is formed, the protrusion 520 and the base unit 510 are integrally formed. In a case where the respective display devices are coupled to each other, the protrusion 520 is dented toward the base unit 510. The protrusion 520 may be manufactured to have various forms in consideration of the process cost and the buffering action of the buffer member 500.

Referring to FIGS. 12A to 12C, a form of the protrusion 520 may be adjustable. The protrusion 520 may have an apex on one end portion as illustrated in FIG. 12A. The protrusion 520 may have a rounded end on one end portion as illustrated in FIG. 12B. The protrusion 520 may have one end portion having a prism form where two or more of crests and troughs are repeated as illustrated in FIG. 12C. In a case where the protrusion 520 is transformed as described above, the compressed length may be elongated, such that the buffer member 500 is capable of absorbing more external shock.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device, comprising:
a bottom chassis having an inserting portion on a side wall;
a display panel disposed on the bottom chassis;
a top chassis coupled to the bottom chassis and having an opening on a position corresponding to the inserting portion; and
a buffer member disposed in the inserting portion and the opening,
wherein the buffer member comprises:
a base unit disposed in the inserting portion, the base unit having an inserting hole inside; and
a protrusion engaged with the inserting portion and the opening, overlapping or being drawn out from the base unit, the protrusion being movable in the inserting hole in a sliding manner, a cross sectional area of a trailing end of the protrusion being smaller than a cross sectional area of the opening, the trailing end being an end following a remaining portion of the protrusion as the protrusion is inserted into the inserting hole, the cross section of the trailing end and the cross section of the opening being defined as perpendicular to a direction of the sliding; and the inserting portion being dented and recessed relative to an outward-facing surface of the side wall of the bottom chassis.

2. The display device of claim 1, wherein the protrusion is extended from the base unit.

3. The display device of claim 1, wherein the protrusion extends outwards from the top chassis.

4. The display device of claim 1, the display panel being substantially planar, a direction of sliding of the protrusion in the inserting hole being substantially parallel to the plane of the display panel.

5. The display device of claim 1, the inserting portion being dented and extended in the side wall of the bottom chassis, the inserting portion being recessed relative to an outward-facing surface of the side wall of the bottom chassis.

6. The display device of claim 1, wherein the buffer member is made of a flexible material.

7. The display device of claim 1, further comprising a mold frame coupled to the bottom chassis and having a penetrating hole.

8. The display device of claim 7, wherein the protrusion is engaged with the penetrating hole.

9. A multi-display device comprising a first display device and a second display device disposed adjacent to each other, wherein each of the first display device and the second display device comprises:
a bottom chassis having an inserting portion on a side wall;
a display panel disposed on the bottom chassis;
a top chassis coupled to the bottom chassis and having an opening on a position corresponding to the inserting portion; and
a buffer member disposed in the inserting portion and the opening,
wherein the buffer member comprises:
a base unit disposed in the inserting portion, the base unit having an inserting hole inside; and
a protrusion engaged with the inserting portion and the opening, overlapping or being drawn out from the base unit, the protrusion being movable in the inserting hole in a sliding manner; and the inserting portion being dented and recessed relative to an outward-facing surface of the side wall of the bottom chassis.

10. The multi-display device of claim 9, wherein the protrusion is extended from the base unit.

11. The multi-display device of claim 9, wherein the protrusion of the first display panel and the protrusion of the second display device are in contact with each other.

12. The multi-display device of claim 9, wherein the buffer members are disposed on each coupling side surface of the first display device and the second display device.

13. The multi-display device of claim 9, the display panels each being substantially planar and being coplanar with respect to each other, the directions in which the protrusions in the inserting holes are movable in a sliding manner being oriented along a single line, the line being substantially parallel to the plane of the display panels.

14. The multi-display device of claim 9, each inserting portion being dented and extended in the side wall of the respective bottom chassis, the inserting portions being recessed relative to an outward-facing surface of each respective side wall.

15. The multi-display device of claim 9, wherein the buffer member is made of a flexible material.

16. The multi-display device of claim 9, further comprising a mold frame coupled to the bottom chassis and having a penetrating hole, wherein the protrusion is disposed in the penetrating hole.

* * * * *